United States Patent
Setterberg (10) Patent No.: US 9,521,314 B2
(45) Date of Patent: Dec. 13, 2016

(54) FINGERPRINT ENROLLMENT USING ELONGATED FINGERPRINT SENSOR

(71) Applicant: FINGERPRINT CARDS AB, Göteborg (SE)

(72) Inventor: Eric Setterberg, Västra Frölunda (SE)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 14/833,890

(22) Filed: Aug. 24, 2015

(65) Prior Publication Data

US 2016/0234430 A1 Aug. 11, 2016

(30) Foreign Application Priority Data

Feb. 6, 2015 (SE) ...................................... 1550135

(51) Int. Cl.
| | |
|---|---|
| *H04N 9/47* | (2006.01) |
| *H04N 7/18* | (2006.01) |
| *H04N 5/232* | (2006.01) |
| *G06K 9/00* | (2006.01) |

(52) U.S. Cl.
CPC ...... *H04N 5/23219* (2013.01); *G06K 9/00013* (2013.01)

(58) Field of Classification Search
None
See application file for complete search history.

(56) References Cited

U.S. PATENT DOCUMENTS

| | | | |
|---|---|---|---|
| 5,828,773 | A | 10/1998 | Setlak et al. |
| 6,795,569 | B1 | 9/2004 | Setlak |
| 2010/0303311 | A1 | 12/2010 | Shin et al. |
| 2013/0259330 | A1 | 10/2013 | Russo et al. |
| 2014/0003677 | A1 | 1/2014 | Han et al. |
| 2014/0003678 | A1 | 1/2014 | Vieta et al. |
| 2014/0003679 | A1 | 1/2014 | Han et al. |

FOREIGN PATENT DOCUMENTS

WO 9846114 A2 10/1998

OTHER PUBLICATIONS

PCT International Search Report and Written Opinion dated Dec. 2, 2015 for PCT International Application No. PCT/SE2015/050927 (19 pages).

*Primary Examiner* — Chikaodili E Anyikire
(74) *Attorney, Agent, or Firm* — Remarck Law Group PLC (57) ABSTRACT

The present invention relates to a method of enrolling a fingerprint of a user's finger, by means of an elongated fingerprint sensor having a sensing area being smaller than the fingerprint. The method comprises the steps of instructing the user to place the finger on the fingerprint sensor with a first finger orientation for achieving a first angle between a longitudinal finger axis and a longitudinal sensor axis; acquiring a partial fingerprint image for the first orientation; instructing the user to place the finger on the fingerprint sensor with a second finger orientation for achieving a second angle; acquiring a partial fingerprint image for the second finger orientation; and forming a fingerprint enrollment representation for the finger based on the partial fingerprint images for the first and second finger orientations and a relation between the first angle and the second angle.

8 Claims, 6 Drawing Sheets

FINGERPRINT ENROLLMENT USING ELONGATED FINGERPRINT SENSOR

CROSS-REFERENCE TO RELATED APPLICATIONS

This application claims the benefit of Swedish Patent Application No. 1550135-6, filed Feb. 6, 2015. The disclosure of the above application is incorporated herein by reference in its entirety.

FIELD OF THE INVENTION

The present invention relates to a method of enrolling a fingerprint, and to a fingerprint enrollment system.

BACKGROUND OF THE INVENTION

Various types of biometric systems are used more and more in order to provide for increased security and/or enhanced user convenience.

In particular, fingerprint sensing systems have been adopted in, for example, consumer electronic devices, thanks to their small form factor, high performance, and user acceptance.

To save cost and valuable surface space, there is an effort towards smaller and smaller fingerprint sensors, which may be substantially smaller than the user's fingerprint.

One way of achieving satisfactory biometric performance with a small fingerprint sensor is to provide a so-called swipe sensor or strip sensor. By instructing the user to swipe his finger across the sensor surface and capturing image slices during the swiping motion sufficient fingerprint information can be collected.

For some applications, however, swiping the finger across the sensor may not be considered to be sufficiently intuitive and simple to the user.

For such and other applications, fingerprint sensing systems employing small sensors for stationary finger placement have been proposed. In such fingerprint sensing systems, the user may be authenticated against an enrolled fingerprint representation (often referred to as a template) based on a single partial fingerprint image from the sensor.

For achieving the desired satisfactory biometric performance when authenticating based on a single partial fingerprint image from a small fingerprint sensor, it may be necessary that the enrolled template corresponds to a considerably larger portion of the user's fingerprint than the partial fingerprint image captured in connection with an authentication attempt.

One way of achieving such a larger enrolled template is to enroll users on a larger fingerprint sensor. This approach is, however, not suitable for many applications where enrollment and authentication should be carried out using the same electronic device, such as a mobile communication device.

It has therefore been proposed to combine several partial images from corresponding finger placements on a small fingerprint sensor to form a combined template for enrollment. It has, however, been found that it may sometimes be difficult to combine the partial images for various reasons.

US 2014/0003678 discloses an enrollment method in which navigation information from one or more navigation sensors is used to determine if there has been finger motion, including rotation, between partial fingerprint images. If there has been motion between images, the partial fingerprint image is adjusted using the navigation information.

However, there appears to still be room for improvement. In particular, it would be desirable to provide for a facilitated combination of partial fingerprint images, resulting in an enrollment procedure that is more convenient for the user.

SUMMARY

In view of the above-mentioned and other drawbacks of the prior art, it is an object of the present invention to provide for improved enrollment using partial fingerprint images, in particular an enrollment procedure that is more convenient for the user.

According to a first aspect of the present invention, it is therefore provided a method of enrolling a fingerprint of a user's finger having a longitudinal finger axis, by means of a fingerprint enrollment system comprising: an elongated fingerprint sensor for acquiring partial fingerprint images of the fingerprint, the fingerprint sensor having a sensing area being smaller than the fingerprint and having a longitudinal sensor axis; processing circuitry connected to the fingerprint sensor for forming a fingerprint enrollment representation based on a plurality of acquired partial fingerprint images; a memory; and a user communication interface for providing instructions to the user. The method comprises the steps of: instructing, through the user communication interface, the user to place the finger on the fingerprint sensor with a first finger orientation for achieving a first angle between the longitudinal finger axis and the longitudinal sensor axis; acquiring, using the fingerprint sensor, a partial fingerprint image for the first orientation; instructing, through the user communication interface, the user to place the finger on the fingerprint sensor with a second finger orientation for achieving a second angle, different from the first angle, between the longitudinal finger axis and the longitudinal sensor axis; acquiring, using the fingerprint sensor, a partial fingerprint image for the second orientation; forming, by the processing circuitry, the fingerprint enrollment representation for the finger based on the partial fingerprint images for the first and second finger orientations and a relation between the first angle and the second angle; and saving, by the processing circuitry, the fingerprint enrollment representation to the memory together with an identifier for the fingerprint to thereby enroll the fingerprint.

By the term "enrollment representation" should be understood any representation of a fingerprint usable as a basis for authenticating an authentication representation based on a fingerprint image acquired in connection with an authentication attempt.

For example, the enrollment representation may be a composite fingerprint template formed through assembly of the acquired partial fingerprint images or assembly of partial templates, each being based on an acquired partial fingerprint image. In this case, the relation between the above-mentioned first and second angles may be used for correctly assembling the partial fingerprint images or the partial templates.

Alternatively, the enrollment representation may be formed by a plurality of such partial templates, each being based on an acquired partial fingerprint image. In this case, the relation between the above-mentioned first and second angles may be used for correctly geometrically relating the partial templates to each other and/or for determining the total continuous area covered by partial fingerprints on which the partial templates are based.

It should be noted that a fingerprint enrollment system may be comprised in a stand-alone electronic device, such as a mobile communication device, or may be formed by interconnected devices, such as a computer and a fingerprint acquisition device connected to the computer.

The "user communication interface" may be any interface suitable for providing instructions to the user. To provide instructions to the user, the user communication interface may be arranged and configured to stimulate at least one of the user's senses. For instance, the user communication interface may provide instructions through visual display, sound or tactile stimulation.

The fingerprint sensor may, for example, be a capacitive fingerprint sensor detecting a measure indicative of the capacitive coupling between each sensing element in an array of sensing elements and a finger surface touching the sensor surface. Sensing elements at locations corresponding to ridges in the fingerprint will exhibit a stronger capacitive coupling to the finger than sensing elements at locations corresponding to valleys in the fingerprint.

However, the various embodiments of the present invention are not limited to a particular fingerprint sensing technology, but are equally applicable to, for instance, optical, thermal or piezo-electric fingerprint sensors etc.

The present invention is based upon the realization that, due to the geometry of an elongated touch fingerprint sensor intended for acquisition of only a small portion of the user's fingerprint, a large number of finger placement events may be necessary before a positional relationship between different partial fingerprint images can be established.

The present inventor has further realized that the number of finger placement events may be reduced if the finger is rotated in relation to the fingerprint sensor between finger placement events, given that the fingerprint enrollment system has information about the orientation of the finger in relation to the elongated fingerprint sensor.

In addition, the inventor has realized that a convenient way of providing the fingerprint enrollment system which such information is to instruct the user to place the finger with a specified finger orientation in relation to the orientation of the elongated fingerprint sensor. Although the fingerprint enrollment system may not know the actual finger orientation resulting from such an instruction to the user, it is likely that the actual finger orientation will be close to the requested finger orientation, in particular if the finger orientation is selected so that it is easy and intuitive for most users to achieve the requested finger orientation.

Furthermore, instructing the user to perform at least two finger placement events with mutually different finger orientations will increase the likelihood of an overlap between the partial fingerprint images, which will facilitate the formation of a high-quality enrollment representation.

According to various embodiments of the present invention, the second orientation may be selected for said second angle to differ from first angle by at least 45°. By instructing the user to place his finger on the fingerprint sensor with two clearly different finger orientations, the difference between length and width of the fingerprint sensor can be efficiently utilized for increasing the chances of overlap between the acquired partial fingerprint images.

Furthermore, it may be beneficial to instruct the user to orient the finger at angles, in relation to the longitudinal sensor axis, that most users are likely to be able to estimate with reasonable accuracy. Such angles may, for example, include 0°, ±45° and ±90°. In particular, 0° and ±90° are expected to be particularly easy for most users to reliably estimate.

According to various embodiments, furthermore, the method of the invention may additionally comprise the steps of: instructing, through the user communication interface, the user to place the finger on the fingerprint sensor with a third finger orientation for achieving a third angle, different from the second angle, between the longitudinal finger axis and the longitudinal sensor axis; and acquiring, using the fingerprint sensor, a partial fingerprint image for the third orientation, wherein the fingerprint template is additionally based on the partial fingerprint for the third finger orientation and a relation between the third angle and the second angle.

The third angle may also be different from the first angle. For instance, the first angle may be 90°, the second angle may be 0°, and the third angle may be 45°.

According to embodiments, however, the third finger orientation may advantageously substantially correspond to the first finger orientation to make the enrollment procedure as simple as possible for the user.

According to various embodiments, moreover, the above-mentioned steps of: instructing, through the user communication interface, the user to place the finger on the fingerprint sensor with a first finger orientation for achieving a first angle between the longitudinal finger axis and the longitudinal sensor axis; acquiring, using the fingerprint sensor, a partial fingerprint image for the first orientation; instructing, through the user communication interface, the user to place the finger on the fingerprint sensor with a second finger orientation for achieving a second angle, different from the first angle, between the longitudinal finger axis and the longitudinal sensor axis; and acquiring, using the fingerprint sensor, a partial fingerprint image for the second orientation, may be repeated until it is determined, by the processing circuitry, that sufficient fingerprint information has been acquired.

It is expected that it will be considered relatively uncomplicated to alternate between two finger orientations, in particular if the finger orientations are intuitive, such as 0° and 90° or −45° and +45° etc.

Furthermore, the method according to these embodiments may additionally comprise the steps of determining, by the processing circuitry, a continuous area of the fingerprint jointly covered by the acquired partial fingerprint images; and determining, by the processing circuitry, that sufficient fingerprint information has been acquired when the continuous area is greater than a predefined area.

Such a predefined area may be in the range of one cm$^2$.

According to a second aspect of the present invention, there is provided a fingerprint enrollment system for enrolling a fingerprint of a user's finger having a longitudinal finger axis, the fingerprint enrollment system comprising: an elongated fingerprint sensor having a sensing area being smaller than the fingerprint and having a longitudinal sensor axis; a memory; a user communication interface; and processing circuitry connected to the fingerprint sensor, to the memory, and to the user communication interface for: controlling the user communication interface to provide an instruction to the user to place the finger on the fingerprint sensor with a first finger orientation for achieving a first angle between the longitudinal finger axis and the longitudinal sensor axis; controlling the fingerprint sensor to acquire a partial fingerprint image for the first orientation; controlling the user communication interface to provide an instruction to the user to place the finger on the fingerprint sensor with a second finger orientation for achieving a second angle, different from the first angle, between the longitudinal finger axis and the longitudinal sensor axis; controlling the fingerprint sensor to acquire a partial fingerprint image for the second orientation; determining a fingerprint enrollment representation for the finger based on the partial fingerprint images for the first and second finger orientations and a relation between the first angle and the second angle; and saving the fingerprint enrollment representation to the memory together with an identifier for the fingerprint to thereby enroll the fingerprint.

The processing circuitry may be provided in the form of one or several processors, which may also control other functions of the electronic device.

Further embodiments of, and effects obtained through this second aspect of the present invention are largely analogous to those described above for the first aspect of the invention.

In summary, the present invention relates to a method of enrolling a fingerprint of a user's finger, by means of an elongated fingerprint sensor having a sensing area being smaller than the fingerprint. The method comprises the steps of instructing the user to place the finger on the fingerprint sensor with a first finger orientation for achieving a first angle between a longitudinal finger axis and a longitudinal sensor axis; acquiring a partial fingerprint image for the first orientation; instructing the user to place the finger on the fingerprint sensor with a second finger orientation for achieving a second angle; acquiring a partial fingerprint image for the second finger orientation; and forming a fingerprint enrollment representation for the finger based on the partial fingerprint images for the first and second finger orientations and a relation between the first angle and the second angle.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the method and electronic device according to the present invention are mainly described with reference to an enrollment system included in a mobile phone. Furthermore, the user is instructed to alternate between a first finger orientation resulting in an angle between the finger longitudinal axis and the sensor longitudinal axis being about 90° and a second finger orientation resulting in an angle between the finger longitudinal axis and the sensor longitudinal axis being about 0°.

It should be noted that this by no means limits the scope of the present invention, which equally well includes, for example, fingerprint enrollment systems comprised in, or formed through the combination of other electronic devices such as tablets, computers or watches. Moreover, the user may be instructed to place his finger on the fingerprint sensor with other finger orientations, such as ±45° etc.

Figure 1A:
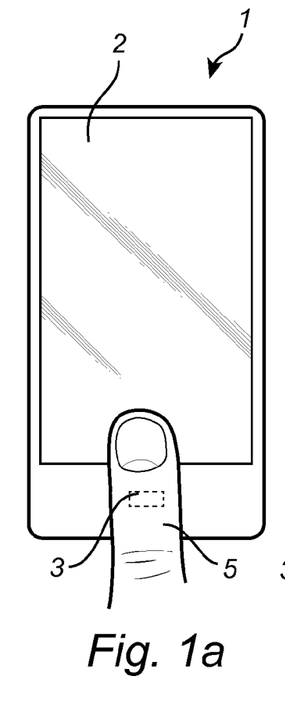
FIGS. 1a-c schematically show three different exemplary authentication attempts using a fingerprint enrollment system comprising small elongated fingerprint sensor.
Figure 1B:
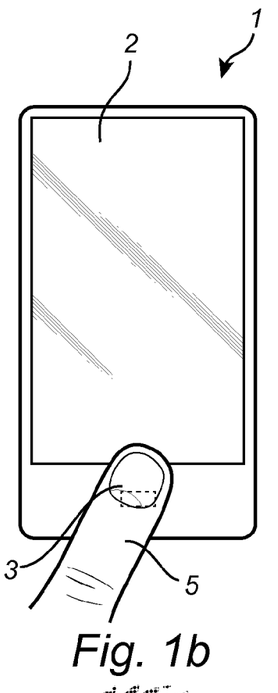
Figure 1C:
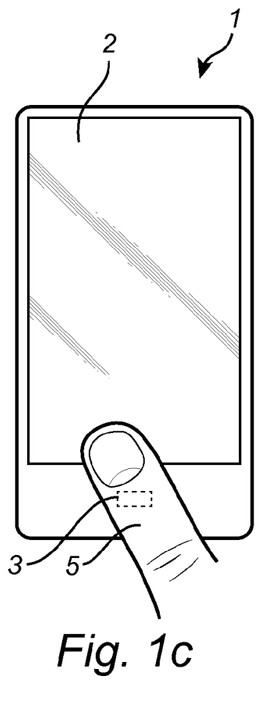

For the purpose of providing an introduction to the challenges involved in using a small elongated fingerprint sensor, FIGS. 1a-c schematically show three different exemplary authentication attempts using a small elongated fingerprint sensor.

Referring first to FIG. 1a, a fingerprint enrollment system 1, here shown as being included in a mobile phone, comprises a touch display 2 and a fingerprint sensor 3. The touch display 2 comprises a touch sensor for touch-based control of the mobile phone and a display acting as a user communication interface. The fingerprint sensor 3 is considerably smaller than the total fingerprint of the user and is elongated with an exemplary aspect ratio of about 1:3.

In FIG. 1a, the user of the mobile phone makes a first authentication attempt by placing his finger 5 on the fingerprint sensor 3.

FIG. 1b and FIG. 1c illustrate second and third authentication attempts in which the user places his finger 5 on the fingerprint sensor 3.

As is indicated in FIGS. 1a-c, a user will typically not place his finger in exactly the same way on the fingerprint sensor 3 in connection with different authentication attempts. However, the user will expect the authentication attempts to succeed in at least all of the cases shown in FIGS. 1a-c to be motivated to continue to use fingerprint authentication.

Figure 2:
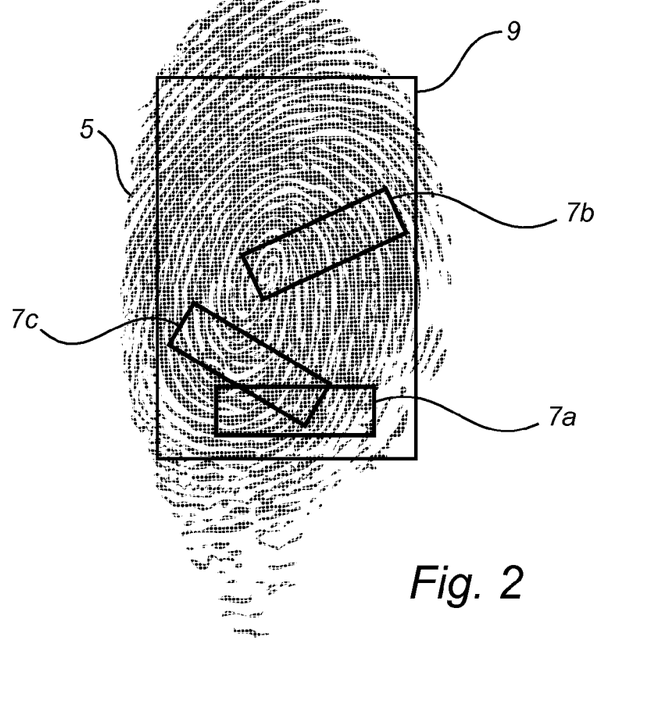
FIG. 2 schematically illustrates the partial fingerprint images acquired in FIGS. 1a-c in relation to the user's fingerprint.

In FIG. 2, the different portions of the user's fingerprint imaged in the different partial fingerprint images acquired in connection with the authentication attempts in FIGS. 1a-c are indicated on an illustration of the total fingerprint of the finger 5. In FIG. 2, the first fingerprint portion 7a corresponds to the authentication attempt in FIG. 1a, while the second 7b and third 7c fingerprint portions correspond to FIGS. 1b and 1c, respectively.

Considering the illustration in FIG. 2, it is easy to understand that, for all of the authentication attempts in FIGS. 1a-c to be successful, the stored fingerprint template used for authentication using the partial fingerprint images should correspond to a considerably larger portion of the user's fingerprint than each of the fingerprint portions 7a-c imaged by the partial fingerprint images. An exemplary minimum coverage of the stored fingerprint template is schematically indicated by the rectangle 9 in FIG. 2.

Having now briefly explained the need for a fingerprint template corresponding to a relatively large portion of the user's fingerprint, various embodiments of the present invention providing for such a fingerprint template will be described in the following.

Figure 3:
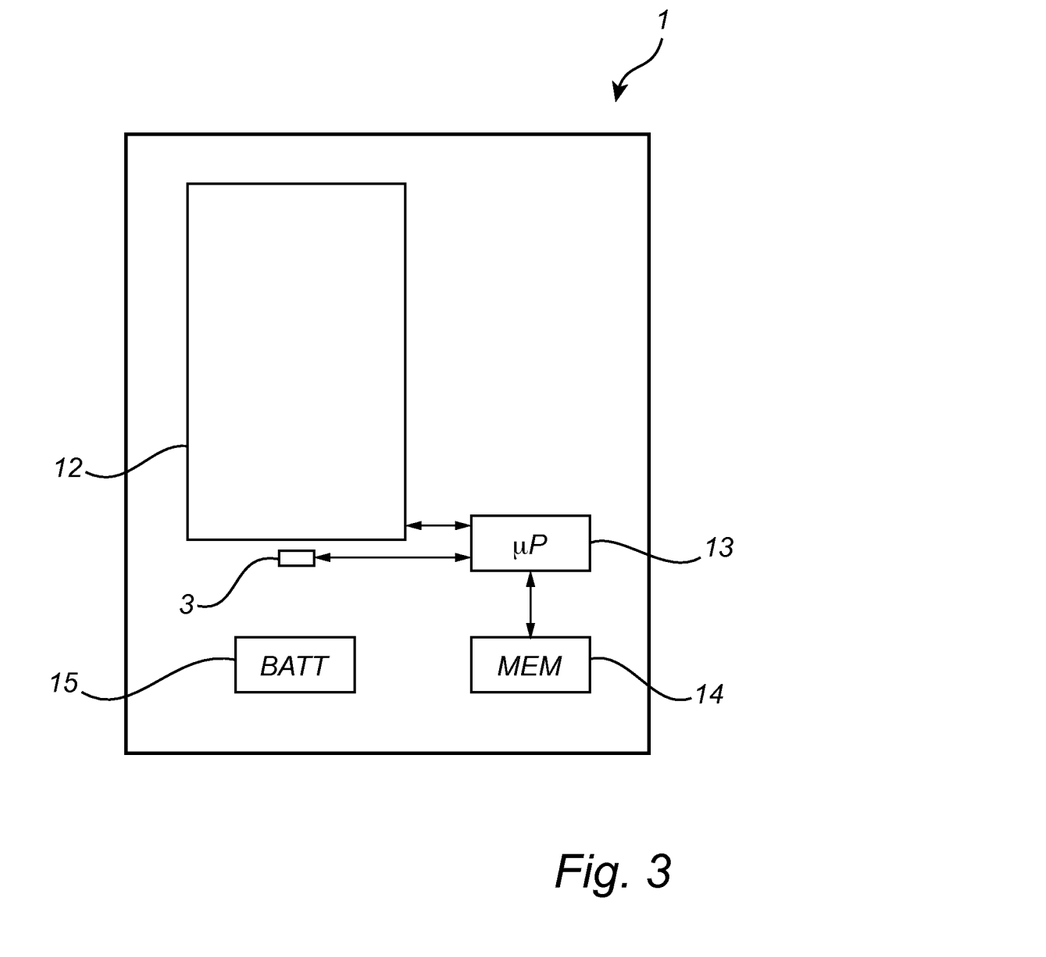
FIG. 3 is a block diagram of the fingerprint enrollment system in FIG. 1.

Referring to the block diagram in FIG. 3, the fingerprint enrollment system 1 in FIG. 1 comprises, in addition to the fingerprint sensor 3, a display 12, processing circuitry here in the form of microprocessor 13, a memory 14 and a battery 15 for providing electrical energy to the various components of the fingerprint enrollment system 1. Although the processing circuitry is schematically indicated in FIG. 3 as a single microprocessor, it should be noted that this is a simplified illustration, and that the processing circuitry may comprise several processors. For instance, the processing circuitry may comprise a fingerprint processor dedicated for acquisition and processing of fingerprint images, template generation and/or authentication. Moreover, the processing circuitry may comprise a display driver for control of the display 12 etc.

Figure 4:
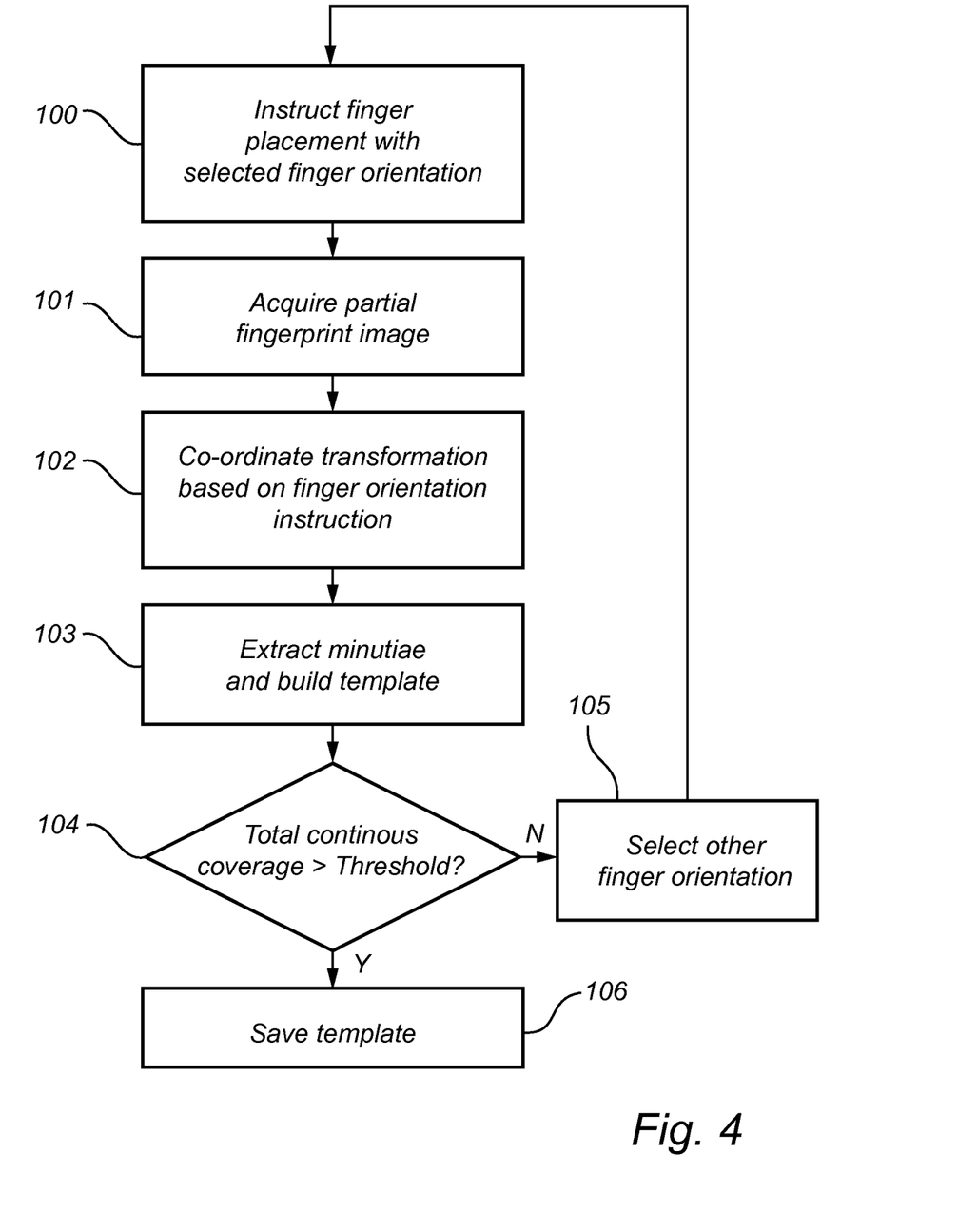
FIG. 4 is a flow-chart schematically illustrating an enrollment method according to an embodiment of the present invention.

An exemplary embodiment of the enrollment method according to the present invention will now be described with reference to the flow-chart in FIG. 4 together with the illustrations in FIG. 3, FIGS. 5a-d, and FIG. 6.

Figure 5A:
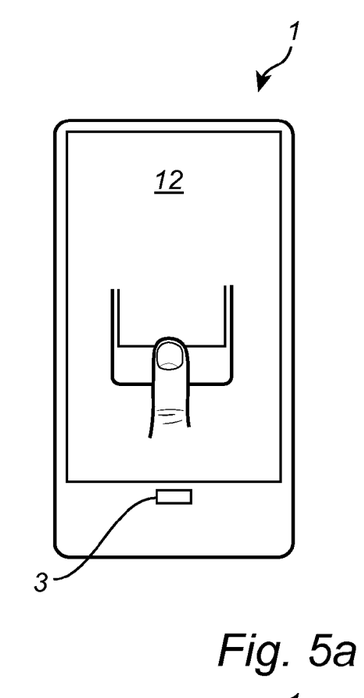
FIGS. 5a-d schematically illustrate a part of the enrollment sequence in FIG. 4.
Figure 5B:
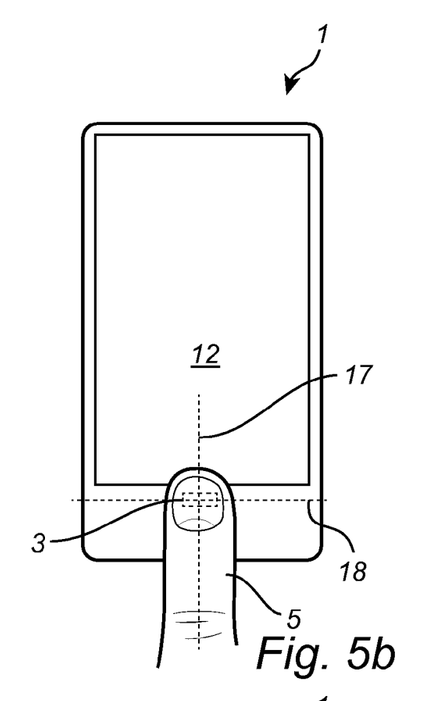

In a first step 100 of the enrollment method, the user is instructed to place the finger to be enrolled on the fingerprint sensor 3 with a certain selected finger orientation. This step may be carried out by controlling, using the processing circuitry 13, the user communication interface, such as the display 12 in FIG. 3 and FIGS. 5a-d to display instructions to the user. An example instruction to the user is shown in FIG. 5a in the form of an image of the mobile phone with a finger arranged on the fingerprint sensor with the selected finger orientation. Based on the instruction in FIG. 5a, the user places his finger 5 on the fingerprint sensor 3 as is schematically indicated in FIG. 5b.

In this case the finger orientation is selected for providing an angle between the finger longitudinal axis 17 and the sensor longitudinal axis 18 of about 90°.

Figure 6:
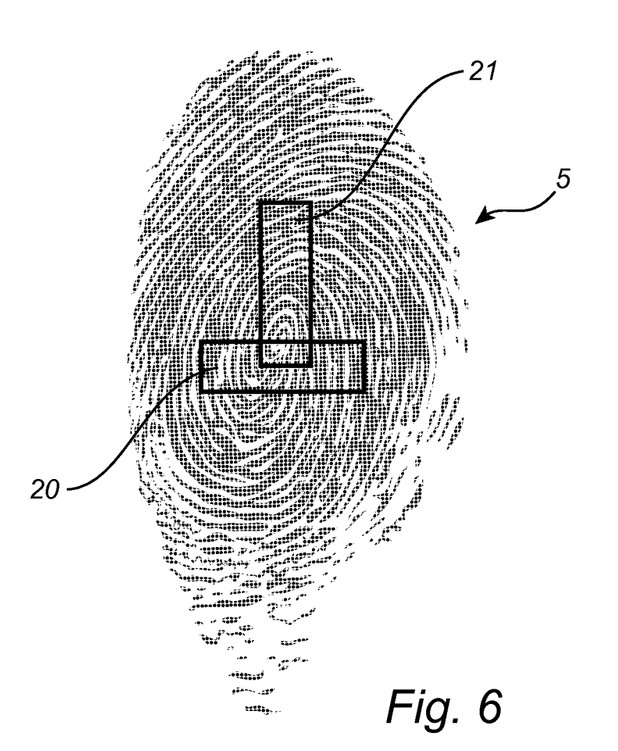
FIG. 6 schematically shows exemplary first and second acquired partial fingerprint images arranged in relation to the complete fingerprint.

In the subsequent step 101, a partial fingerprint image for the selected finger orientation is acquired by the processor 13 from the fingerprint sensor. FIG. 6 schematically shows the acquired partial fingerprint image 20 resulting from a finger orientation selected for providing an angle between the finger longitudinal axis 17 and the sensor longitudinal axis 18 of about 90°. In FIG. 6, it is assumed that the indicated partial fingerprint image 20 is the first acquired partial fingerprint image in the enrollment procedure.

In step 102, a co-ordinate transformation (rotation) of the acquired partial fingerprint image 20 is performed by the processor 13 based on the finger orientation instruction provided to the user in step 100.

Following (or before) the co-ordinate transformation in step 102, template data in the form of characteristic fingerprint information, such as minutiae, may be extracted, in step 103, from the partial fingerprint image 20 to form a fingerprint template.

Figure 7:
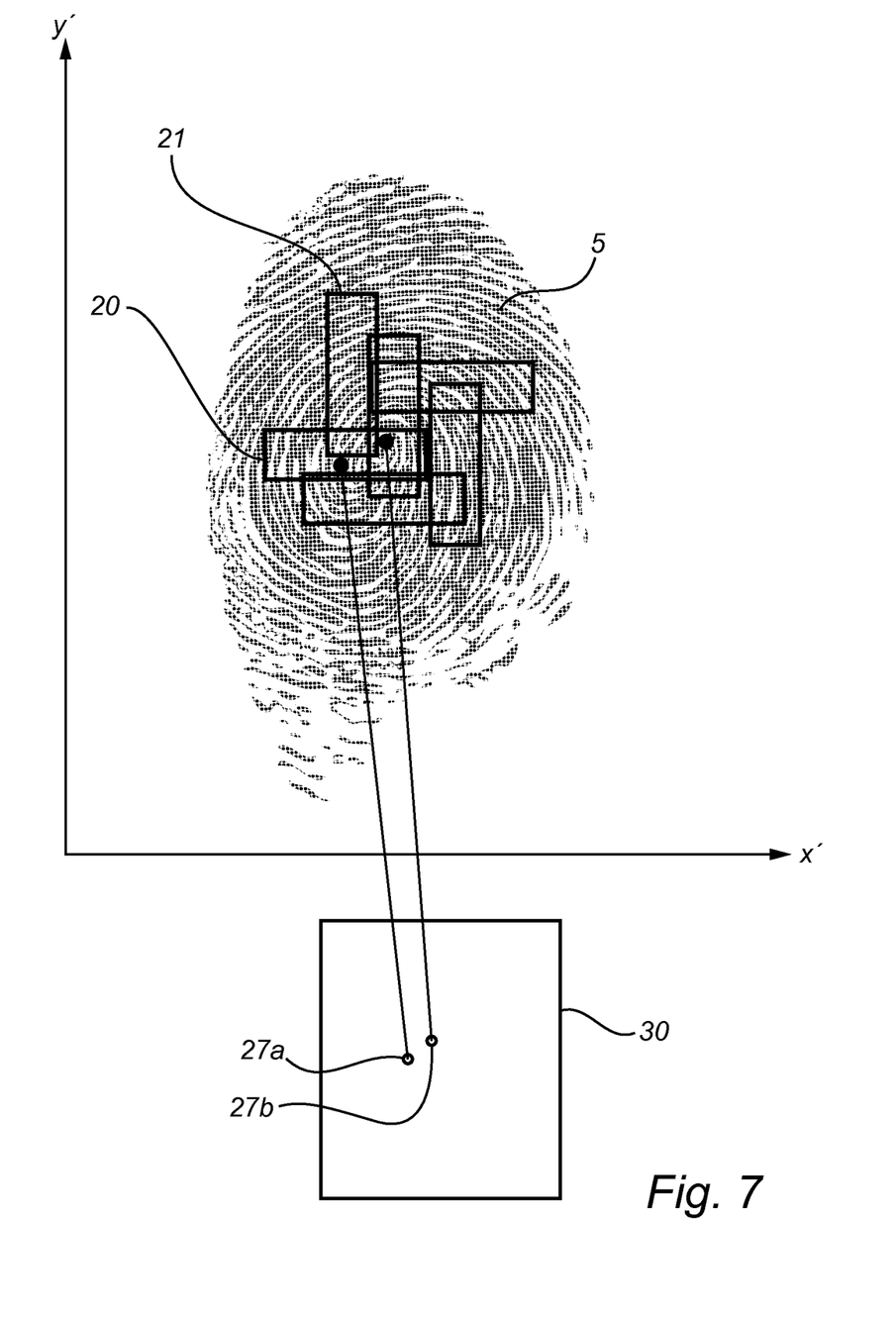
FIG. 7 is a schematic illustration of a sequence of partial fingerprint images in the co-ordinate system of the finger, and also illustrates the formation of a fingerprint template from the partial fingerprint images.

This procedure, which is per se well known to the skilled person, is schematically indicated for the partial fingerprint image 20 in FIG. 7, where minutiae 27a-b are shown to be extracted to a fingerprint template 30 with minutiae information and positions in relation to the finger 5.

In the following step 104, it is determined if the total continuous coverage of the fingerprint by the portions of the fingerprint that have been imaged so far exceeds a pre-defined threshold coverage.

If it is determined in step 104 that the total coverage does not exceed the threshold coverage, such as would be the case when only the first partial fingerprint image has been acquired, then the method proceeds to step 105 and selects another finger orientation.

Figure 5C:
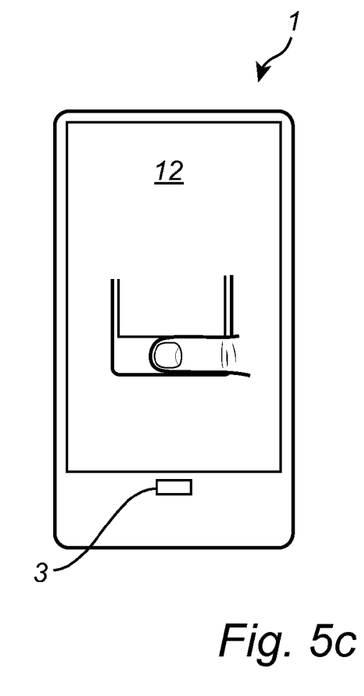
Figure 5D:
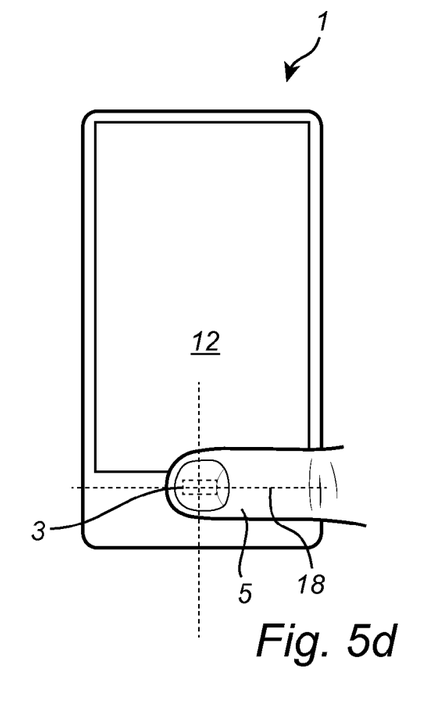

From step 105, the method returns to step 100, in which the processor 13 instructs the user through the display 12 as shown in FIG. 5c to place his finger with another finger orientation, in this case a finger orientation selected for providing an angle between the finger longitudinal axis 17 and the sensor longitudinal axis 18 of about 0°.

A new partial fingerprint image is acquired as described above in step 101, and the co-ordinate transformation (rotation) takes place based on the finger orientation instruction in step 102. In this case, the newly acquired partial fingerprint image (denoted 21 in FIG. 6) is rotated 90° and correlation for assembly (or at least for achieving a positional relationship between the acquired partial fingerprint images or partial templates formed based on the acquired partial fingerprint images) with the previously acquired partial fingerprint image 20 is attempted. Due to the different finger orientations selected to provide different angles between the finger longitudinal axis 17 (FIG. 5b and FIG. 5d) and the sensor longitudinal axis 18, the likelihood for a successful correlation between the previously acquired partial fingerprint image 20 and the newly acquired partial fingerprint image 21 is greatly increased as compared to acquisitions with a small elongated fingerprint sensor without user guidance or with user guidance not aimed at at least approximately achieving a known finger orientation.

If it is determined in step 104 that the total coverage exceeds the threshold coverage, the formed template 30 (FIG. 7) is saved to memory 14 in step 106 and the enrollment procedure is finalized.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A method of enrolling a fingerprint of a user's finger having a longitudinal finger axis, by means of a fingerprint enrollment system comprising:
    an elongated fingerprint sensor for acquiring partial fingerprint images of said fingerprint, the fingerprint sensor having a sensing area being smaller than said fingerprint and having a longitudinal sensor axis;
    processing circuitry connected to said fingerprint sensor for forming a fingerprint enrollment representation for said finger based on a plurality of acquired partial fingerprint images;
    a memory; and
    a user communication interface for providing instructions to said user, said method comprising the steps of:
        instructing, through the user communication interface, the user to place said finger on the fingerprint sensor with a first finger orientation for achieving a first angle between said longitudinal finger axis and said longitudinal sensor axis;
        acquiring, using said fingerprint sensor, a partial fingerprint image for said first finger orientation;
        instructing, through the user communication interface, the user to place said finger on the fingerprint sensor with a second finger orientation for achieving a second angle, different from said first angle, between said longitudinal finger axis and said longitudinal sensor axis;

acquiring, using said fingerprint sensor, a partial fingerprint image for said second finger orientation;

forming, by said processing circuitry, the fingerprint enrollment representation for said finger based on the partial fingerprint images for said first and second finger orientations and a relation between said first angle and said second angle; and saving, by said processing circuitry, the fingerprint enrollment representation to said memory together with an identifier for said fingerprint to thereby enroll said fingerprint.

2. The method according to claim 1, wherein said second orientation is selected for said second angle to differ from first angle by at least 45°.

3. The method according to claim 1, further comprising the steps of:

instructing, through the user communication interface, the user to place said finger on the fingerprint sensor with a third finger orientation for achieving a third angle, different from said second angle, between said longitudinal finger axis and said longitudinal sensor axis; and acquiring, using said fingerprint sensor, a partial fingerprint image for said third finger orientation, wherein said fingerprint template is additionally based on the partial fingerprint for said third finger orientation and a relation between said third angle and said second angle.

4. The method according to claim 3, wherein said third finger orientation substantially corresponds to said first finger orientation.

5. The method according to claim 1, wherein said steps of:

instructing, through the user communication interface, the user to place said finger on the fingerprint sensor with a first finger orientation for achieving a first angle between said longitudinal finger axis and said longitudinal sensor axis;

acquiring, using said fingerprint sensor, a partial fingerprint image for said first finger orientation;

instructing, through the user communication interface, the user to place said finger on the fingerprint sensor with a second finger orientation for achieving a second angle, different from said first angle, between said longitudinal finger axis and said longitudinal sensor axis; and acquiring, using said fingerprint sensor, a partial fingerprint image for said second finger orientation, are repeated until it is determined, by said processing circuitry, that sufficient fingerprint information has been acquired.

6. The method according to claim 5, further comprising the steps of:

determining, by said processing circuitry, a continuous area of said fingerprint jointly covered by said acquired partial fingerprint images; and determining, by said processing circuitry, that sufficient fingerprint information has been acquired when said continuous area is greater than a predefined area.

7. A fingerprint enrollment system for enrolling a fingerprint of a user's finger having a longitudinal finger axis, said fingerprint enrollment system comprising:

an elongated fingerprint sensor having a sensing area being smaller than said fingerprint and having a longitudinal sensor axis;

a memory;

a user communication interface; and processing circuitry connected to said fingerprint sensor, to said memory, and to said user communication interface for:

controlling the user communication interface to provide an instruction to the user to place said finger on the fingerprint sensor with a first finger orientation for achieving a first angle between said longitudinal finger axis and said longitudinal sensor axis;

controlling said fingerprint sensor to acquire a partial fingerprint image for said first finger orientation;

controlling the user communication interface to provide an instruction to the user to place said finger on the fingerprint sensor with a second finger orientation for achieving a second angle, different from said first angle, between said longitudinal finger axis and said longitudinal sensor axis;

controlling said fingerprint sensor to acquire a partial fingerprint image for said second finger orientation;

determining a fingerprint enrollment representation for said finger based on the partial fingerprint images for said first and second finger orientations and a relation between said first angle and said second angle; and saving the fingerprint enrollment representation to said memory together with an identifier for said fingerprint to thereby enroll said fingerprint.

8. The fingerprint enrollment system according to claim 7, wherein a longitudinal extension of the sensing area of said fingerprint sensor is at least one and one half times a transversal extension of the sensing area of said fingerprint sensor.

* * * * *